(12) United States Patent
Halamka et al.

(10) Patent No.: US 12,709,478 B2
(45) Date of Patent: Aug. 18, 2026

(54) DYNAMIC PICK WALL/PUT WALL

(71) Applicant: Dematic Corp., Grand Rapids, MI (US)

(72) Inventors: Collin R. Halamka, Indianapolis, IN (US); Nathan J. Winkler, Medina, OH (US); Andrew J. Kane, Grand Rapids, MI (US); Randall J. Carlson, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 873 days.

(21) Appl. No.: 17/962,823

(22) Filed: Oct. 10, 2022

(65) Prior Publication Data

US 2023/0119061 A1 Apr. 20, 2023

Related U.S. Application Data

(60) Provisional application No. 63/255,697, filed on Oct. 14, 2021.

(51) Int. Cl.
*B65G 1/137* (2006.01)
*A47B 57/58* (2006.01)

(52) U.S. Cl.
CPC ......... *B65G 1/1373* (2013.01); *B65G 1/1371* (2013.01); *A47B 57/58* (2013.01); (Continued)

(58) Field of Classification Search
CPC ................ B65G 1/1373; B65G 1/1371; B65G 2203/0233; B65G 2203/044; B65G 2209/04; A47B 57/58
See application file for complete search history.

(56) References Cited

U.S. PATENT DOCUMENTS 10,040,628 B1 8/2018 Misra et al.
10,339,411 B1 * 7/2019 Hua ........................ G06T 17/20
(Continued)

FOREIGN PATENT DOCUMENTS

DE 102015211761 A1 * 12/2016 ............. G06Q 10/08
DE 202016100984 U1 * 4/2017 ........... B65G 1/1373
(Continued)

OTHER PUBLICATIONS

DE 102015211761 (Year: 2016).*
(Continued)

*Primary Examiner* — Ernesto A Suarez
*Assistant Examiner* — Laurence R Brothers
(74) *Attorney, Agent, or Firm* — Gardner, Linn, Burkhart & Ondersma LLP

(57) ABSTRACT

A dynamic storage wall with reconfigurable storage cubbies and methods of operating the storage wall are provided for a storage facility. The storage wall includes a shelf with multiple storage cubbies and one or more repositionable dividers defining boundaries between the cubbies. The storage wall includes a Time of Flight (ToF) sensor array adjacent to the shelf for measuring positions of each of the repositionable dividers. The ToF is also adapted for recognizing when an item has been retrieved from or placed at either of said storage locations. A workflow control system with a computer is connected to the sensor array. The control system utilizes data from the ToF sensor array to determine when a repositionable divider has been moved and/or when an item has been retrieved from a storage location. The system may automatically or manually recognize when a divider is moved and that new measurement is required.

20 Claims, 4 Drawing Sheets

(52) U.S. Cl.
CPC ................ *B65G 2203/0233* (2013.01); *B65G 2203/044* (2013.01); *B65G 2209/04* (2013.01)

(56) References Cited

U.S. PATENT DOCUMENTS

| | | | | |
|---|---|---|---|---|
| 10,810,715 | B2 | 10/2020 | Chamberlin | |
| 11,001,445 | B2 | 5/2021 | Hoffman | |
| 2008/0121168 | A1 | 5/2008 | Ryznar et al. | |
| 2011/0291988 | A1 | 12/2011 | Bamji et al. | |
| 2014/0083058 | A1 | 3/2014 | Issing et al. | |
| 2015/0039458 | A1 | 2/2015 | Reid | |
| 2018/0136735 | A1 | 5/2018 | Pothier | |
| 2018/0215555 | A1* | 8/2018 | Ooba | G01C 11/02 |
| 2019/0079589 | A1 | 3/2019 | Spalla | |
| 2019/0102043 | A1 | 4/2019 | Lee | |
| 2019/0325207 | A1* | 10/2019 | Wang | G01V 8/10 |
| 2019/0375589 | A1* | 12/2019 | Gravelle | B65G 1/04 |
| 2021/0158319 | A1* | 5/2021 | Drago | A47F 1/125 |
| 2021/0276804 | A1* | 9/2021 | Peck | G06Q 10/087 |
| 2022/0164771 | A1 | 5/2022 | Nowicki et al. | |

FOREIGN PATENT DOCUMENTS

| | | | | |
|---|---|---|---|---|
| DE | 102016005691 | A1 | 11/2017 | |
| JP | 2015509241 | A | 3/2015 | |
| JP | 2018158836 | A | 11/2018 | |
| KR | 20180028267 | A | 3/2018 | |
| WO | 2012123033 | A1 | 9/2012 | |
| WO | WO-2014028959 | A1 * | 2/2014 | B65G 1/137 |
| WO | WO-2015191762 | A1 * | 12/2015 | G06V 20/52 |
| WO | 2017200235 | A1 | 11/2017 | |
| WO | 2022118285 | A1 | 6/2022 | |

OTHER PUBLICATIONS

DE 202016100984 (Year: 2017).*

WO-2014028959-A1 (Year: 2014).*

WO-2015191762-A1 (Year: 2015).*

* cited by examiner 18
(18a, 18b)
17
14

DYNAMIC PICK WALL/PUT WALL

CROSS REFERENCE TO RELATED APPLICATION

The present application claims priority of U.S. provisional application Ser. No. 63/255,697, filed Oct. 14, 2021, which is hereby incorporated by reference herein in its entirety.

FIELD OF THE INVENTION

The present invention is directed to order fulfillment, and in particular to fulfilling orders involving directing picking of items by an individual from an inventory area or putting of items to an inventory area.

BACKGROUND OF THE INVENTION

Distribution centers typically utilize order picking systems for the purpose of assembling their customer's orders, such picking systems may include pick/put-walls (which may be commonly referred to throughout as a storage wall, for simplicity). Picking systems in distribution centers may utilize, for example, a central system controller (computer) which interfaces with a customer's host computer, one or more monitors for guiding picking operations, and a series of "second level devices" or section controllers which manage picking zone level activities. The section controllers in turn, control picking bay level and picking slot or location level devices. Each pick location or slot is identified by one of a family of devices which are positioned throughout the picking area giving order information to the pickers and providing an interface for peripheral devices such as scanners. Zone level information may be transmitted to the picker and received from the picker by any number of electronic devices.

Zone and location level devices are generally capable of displaying pick data, acquiring pick confirmation data, displaying quantity adjustment and quantity recall, or other functions which may be relevant to the order picking job at hand. Location level devices often include indicators (e.g. pick-to-lights) and/or information displays. Such indicators or information displays provide instructions to an operator as to how many items to pick from or put to an inventory area, and/or which receptacle on the cart to put the items to or pick the items from. Some pick/put walls may be readily reconfigured to suit changing or cycling of item shapes and sizes. For example, storage walls commonly utilize adjustable or modifiable electronic rail systems to provide various indicatory functions. Indicator lights or displays mounted on the rail system may be moved to different locations on the rail to adapt the storage wall indication system. In order to accommodate different sized receptacles or items, it is typically necessary to reconfigure the storage wall by moving structural elements as well as the indicators or displays to coincide with receptacle spacing. For accuracy purposes, manual measurements may be taken of the structural elements or indicators to ensure proper positioning upon adjustment. Gain style sensors (e.g. photocell sensors) may be used to sense movement of items or appendages of operators during storage operations. Photocells are dependent on color (as a function of light) and may not be particularly reliable in poor lighting conditions (e.g. very bright conditions and very dim conditions).

Throughput is a common metric used in the distribution industry, measuring the quantity of items picked or placed in a unit of time. Throughput may be hampered or decreased by an operator having to adjust or modify the structure or components of a pick/put-wall in order to accommodate different receptacle or item sizes. For example, it may be necessary to adjust pick-to-lights on a light rail adjacent a storage location to provide accurate location information to an operator for subsequent pick/put operations. Throughput is increased by decreasing the amount of time necessary for an operator to (i) modify the structure or components of a storage wall and (ii) locate the proper storage location for the required operation.

SUMMARY OF THE INVENTION

The present invention provides a system and methods for operating a dynamic storage wall in storage facilities or order fulfillment facilities. While the present invention is particularly useful in a warehouse distribution environment, it may also find use in a retail environment for direct-to-consumer order fulfillment as well as other applications. The system and methods reduce downtime and operational inefficiencies by reducing adjustment and reconfiguration tasks that an operator must often perform when reconfiguring and subsequently operating storage put walls/pick walls.

According to one form of the present invention, a dynamic storage wall is provided for improving throughput and reducing downtime related to infrastructure adjustment (e.g. storage wall divider adjustment). The storage wall includes a shelf with a plurality of storage locations in spaced arrangement. Each of the storage locations includes at least one repositionable divider defining a boundary of the storage locations along the shelf. The storage wall includes a sensor array along an edge of the shelf and adjacent to the storage locations. The sensor array is provided for measuring positions of each repositionable divider along the shelf. The sensor array may also be configured to recognize when an item has been retrieved from or placed at either of the storage locations. A workflow control system which includes a computer is electronically connected with the sensor array. The control system may be adapted for automatically monitoring and determining when a repositionable divider has been moved and/or when an item has been retrieved from a storage location. Alternatively, a manual operation or gesture may be required to initiate measurement of the storage locations with the sensor array.

In one aspect, the sensor array includes a time of flight (ToF) sensor to measure a distance from a known location to each of the repositionable dividers to measure the position of each of the repositionable dividers. It is contemplated that gain style sensors (e.g. photocell or optical sensors) may be also be utilized to sense or measure dimensions of storage locations and/or locations of items at storage locations. In another aspect, the sensor array includes a touchless confirmation sensor (e.g. a ToF sensor or optical sensor) to recognize a physical gesture from an operator acknowledging that they have completed an item retrieval or placement operation. Upon recognition of the physical gesture, the sensor communicates a completion signal to the workflow control system.

In yet another aspect, the storage wall includes a confirmation indicator which, upon the workflow control system receiving the completion signal, the confirmation indicator provides a confirmation alert to the operator alerting the operator that the touchless confirmation system has recognized the completion of the operation.

In still another aspect, the sensor array includes an operation indicator (e.g. pick-to-light) to provide a visual cue to an operator to instruct the operator that an operation is required at at least one of the storage locations. The operation indicator may include a lamp strip mounted to the shelf. The lamp strip preferably includes a plurality of individually addressable lamps. Optionally, the lamp strip includes a light emitting diode strip (LED) and each light emitting diode in the strip is individually addressable by the workflow control system. The workflow control system may control the lamp strip such that a subset of lamps are illuminated to correspond to and indicate a width of a storage location on the shelf, or to indicate a location along the shelf to which an operator is to move a repositionable divider.

According to yet another form of the present invention, a method is provided for monitoring a position of a repositionable divider on a shelf (for example, for determining updated width of storage locations or cubbies of a shelf of a dynamic storage wall) by determining relative positions of repositionable dividers along the shelf. The method provides an initial position of a repositionable divider relative to the shelf or a known location proximate the shelf at a computer of a control system. An operator moves the repositionable divider from its initial position to a different, desired or required location or position along the shelf. A sensor array measuring the different position of the divider (such as comparing with a known location proximate the shelf). The workflow system then determines that the divider has been moved based on information received from the sensor array.

In one aspect, providing the initial position of the divider is provided by measuring the initial position of the divider relative to a known location proximate the shelf using the sensor array and then determining the initial position of the divider with the workflow control system based on information received from the sensor array measurement.

In another aspect, the method includes determining when an item has been retrieved from or put to a storage location based on information received from the sensor array. For example, an operator may acknowledge that a retrieval or placement operation has been completed by making a physical gesture toward a touchless confirmation sensor of the sensor array. The touchless confirmation sensor recognizes the operator's gesture and communicates a completion signal to the workflow control system. Optionally, the method may include providing a visual cue or indication to an operator to let the operator know that an operation is required at a particular storage location.

In yet another aspect, a lamp strip with individually addressable lamps (e.g. LEDs) is provided adjacent the shelf, such as along a front edge of the shelf. The method includes illuminating a subset of lamps of the lamp strip to indicate a width of a storage location on the shelf and/or to indicate a location of the shelf to which an operator is required to move a repositionable divider.

According to yet another form of the present invention, a method is provided for monitoring a position of a repositionable divider on a shelf (for example, for determining updated width of storage locations or cubbies of a shelf of a dynamic storage wall) by determining relative position of the repositionable divider along the shelf. The method provides a visual representation of the virtually determined cubby widths. The visual representation is provided by a lamp strip mounted adjacent the shelf. The method includes providing a default map of each storage location along the shelf and illuminating corresponding lights on the lamp strip adjacent each storage location to indicate the default map of storage locations to an operator. Each storage location is delineated with a different light pattern (e.g. different light color). The method includes monitoring the storage wall with an array of time of flight (ToF) sensors and determining if one or more repositionable dividers have been moved along the shelf. If it is determined by the workflow control system that one or more dividers have been moved, the method includes determining the new position of each moved divider. The new positions are determined by measuring, with the ToF sensor array, a distance from a known location to the new location of each moved divider and comparing that with the default map divider locations. The map of storage locations is updated with the new location positions of the moved dividers and corresponding lights on the lamp strip are illuminated adjacent each storage location to indicate the updated map of storage locations to the operator.

In one aspect, the determination or indication as to whether the dividers have been moved may be done by an operator who manually gestures in proximity of the ToF sensor array to indicate that dividers have been moved. Alternatively, the determination or indication as to whether the dividers have been moved may be performed automatically by determining with a workflow control system that the dividers have been moved based on information received from the ToF sensor array. The workflow control system is in electronic communication with the ToF sensor array. The workflow control system is adapted for recognizing when dividers have been moved by comparing the default map of storage locations with measurements of the moved dividers taken by the ToF sensor array.

According to another form of the present invention, a method is provided for confirming that a pick or put operation has been completed at a required storage location of a storage facility. The storage facility includes a workflow control system and the storage location includes each of a physical confirmation button, a touchless confirmation sensor for recognizing a physical gesture from an operator, and an item movement detection sensor for recognizing movement of an item into or from the storage location. The physical confirmation button, touchless confirmation sensor, and item movement detection system are each in electronic communication with the workflow control system. The method includes the workflow control system illuminating an indicator light adjacent a storage location to indicate to an operator that a pick or put operation is required at that particular storage location. Optionally, the workflow control system may illuminate a "flood light" which illuminates an interior of a storage location (i.e. cubby) to indicate to an operator that a pick or put operation is required at that particular storage location. The operator performs the pick or put operation at the storage location and either the operator or workflow control system provides confirmation that the operation is complete. The workflow control system confirms that the pick or put operation is completed via one or more of the following confirmatory responses (i) the operator presses the physical confirmation button, (ii) the operator performs a confirmatory gesture in proximity to the touchless confirmation sensor, and/or (iii) the movement detection sensor determines that the item has been placed into or retrieved from the storage location.

Accordingly, the present invention provides a method and system for recognizing when moveable elements (e.g. dividers) of a storage wall have been repositioned, and determining the new positions of the moved elements. The method and system also update a visual representation of the storage wall layout by adjusting the illumination pattern of a lamp strip that is attached to the storage wall. The visual representation or map enables an operator to confirm that the system has recognized the layout changes that the operator has made to the storage wall. The system is operable to recognize touchless gestures from the operator as well as recognizing when an item is placed into or removed from the storage wall. The system utilizes ToF sensors to measure distances to structural elements of the storage wall and a workflow control system utilizes the ToF sensor measurement data to determine the new locations of any elements that have been moved.

These and other objects, advantages, purposes and features of this invention will become apparent upon review of the following specification in conjunction with the drawings.

DESCRIPTION OF THE PREFERRED EMBODIMENTS

Figure 1:
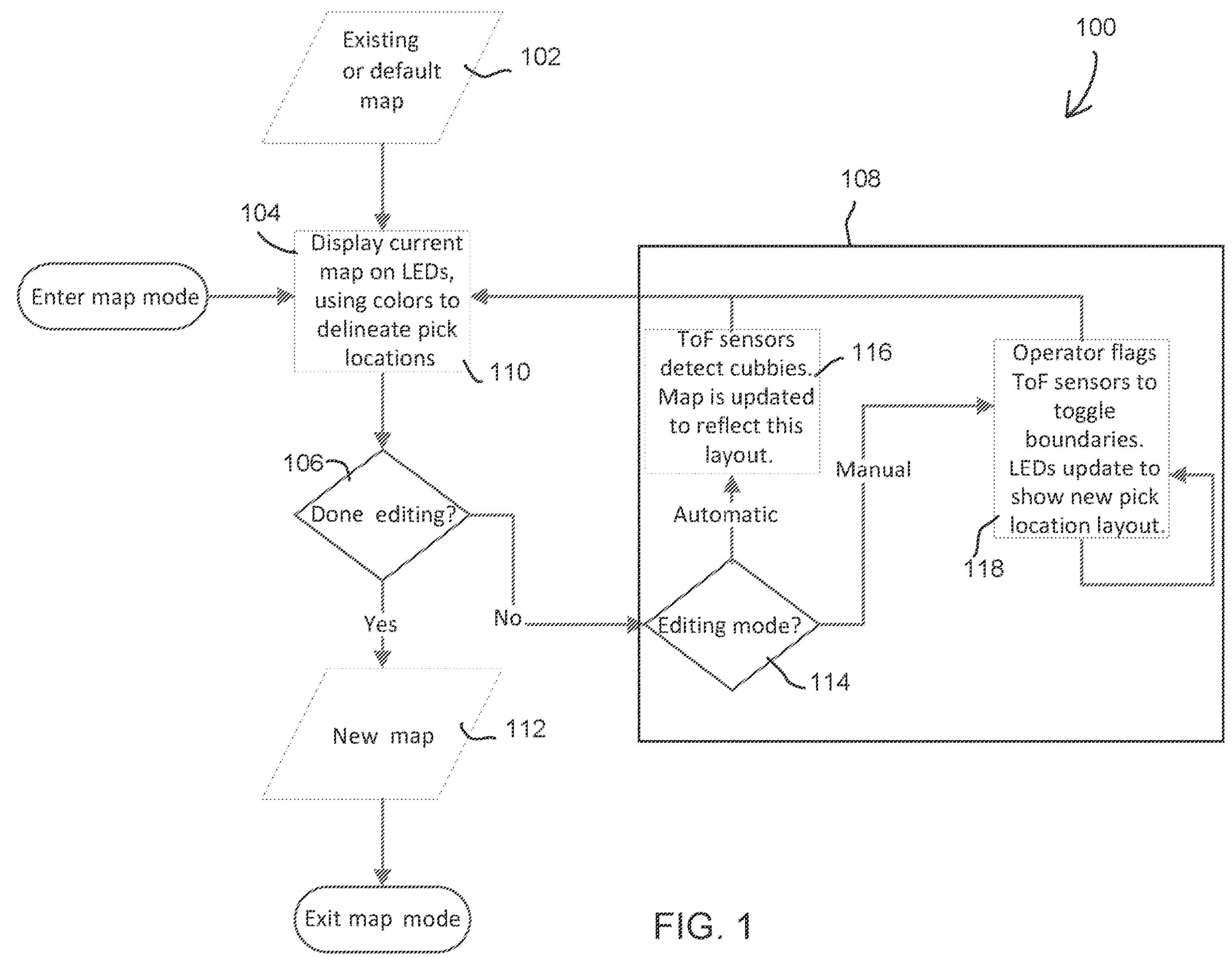
FIG. 1 is a diagram of a method for determining and setting the position boundaries of one or more storage locations of a storage wall in accordance with the present invention.
Figure 2:
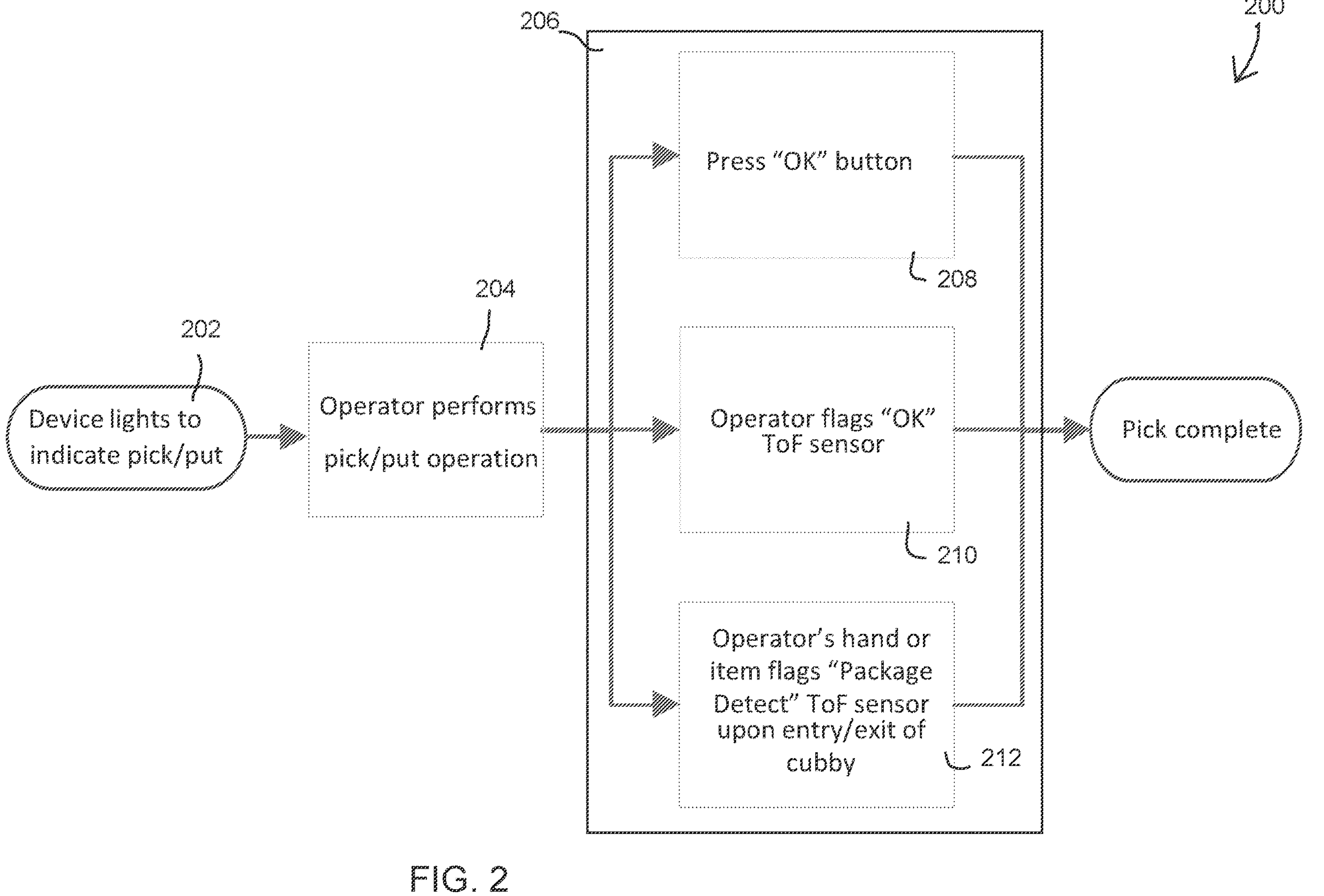
FIG. 2 is a diagram of a method for monitoring and acknowledging completion of an order fulfilment pick operation in accordance with the present invention.
Figure 3:
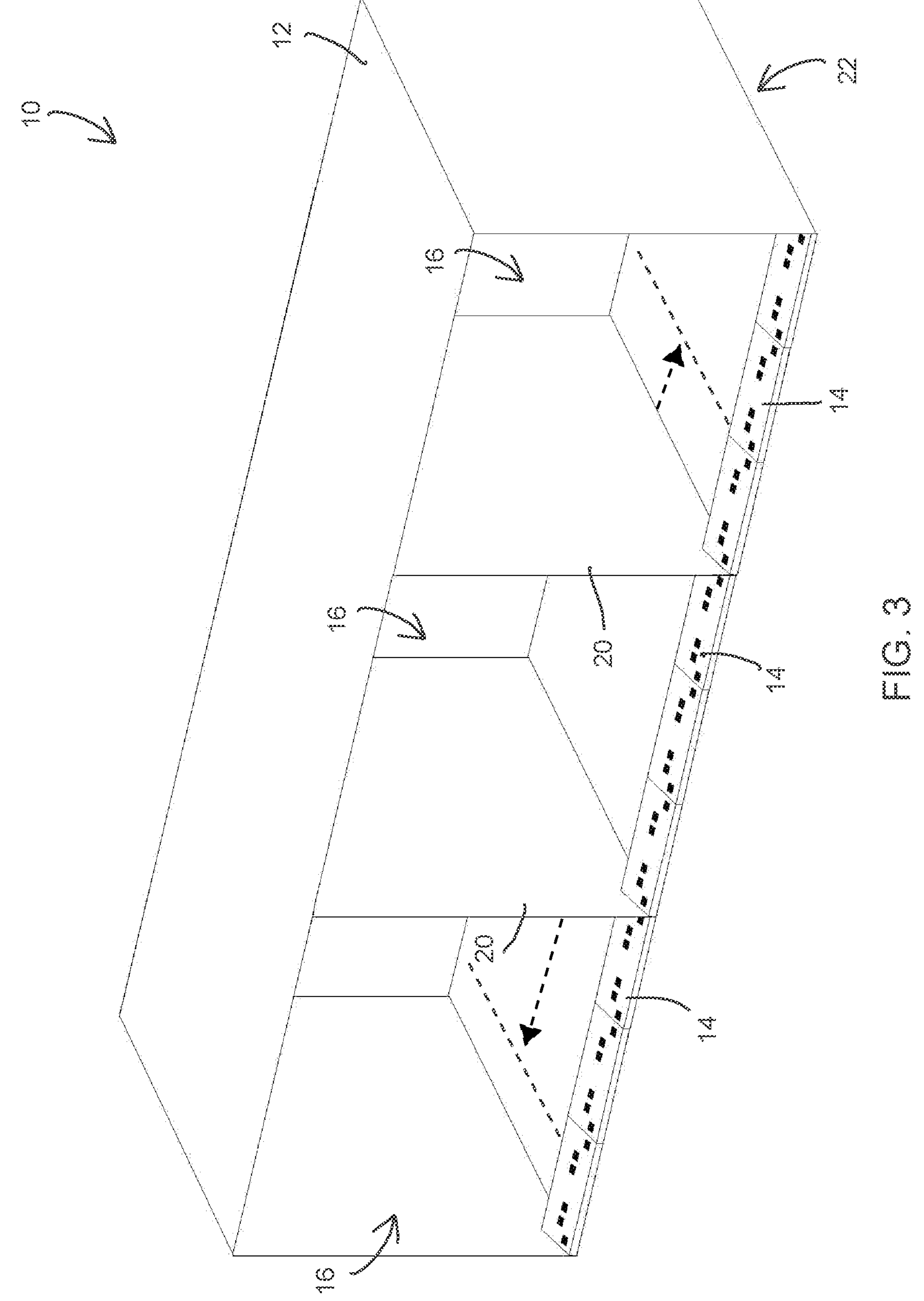
FIG. 3 is a perspective view of a dynamic storage wall having a plurality of storage locations and a sensor array positioned proximate the storage locations, in accordance with the present invention.
Figure 4:
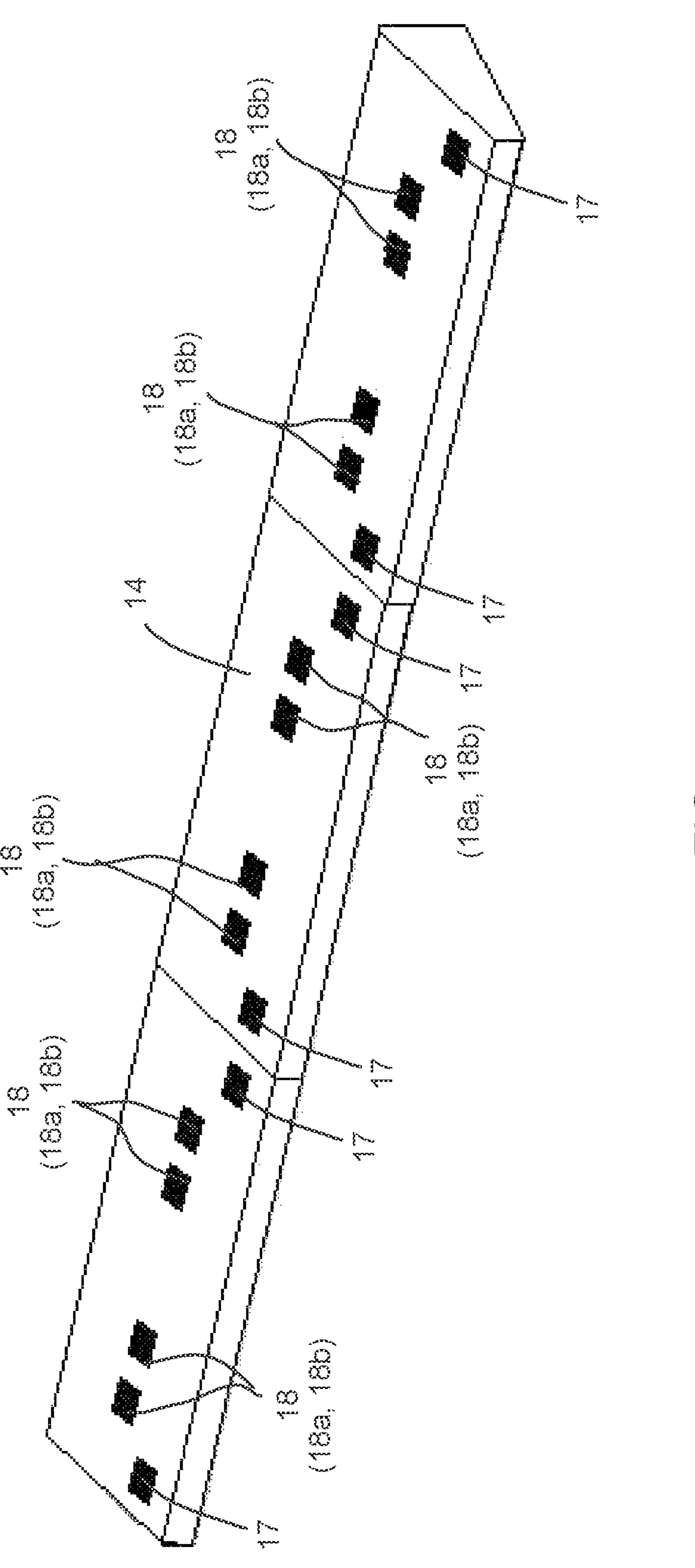
FIG. 4 is perspective view of a portion of the sensor array of the storage wall of FIG. 3.

Referring now to the drawings and the illustrative embodiments depicted therein, a dynamic storage system 10 and method 100 are provided for monitoring the configuration of a dynamic storage wall 12 (e.g. a put wall or pick wall; FIGS. 1 and 3-4). A method 200 is also provided for confirming that an order operation has been completed utilizing three (3) available confirmation techniques (FIG. 2). It will be appreciated that the storage wall 12 may be configured in different sizes and shapes with a plurality of storage locations, including multiple rows and columns of shelves and storage locations, and may include various shapes, arrangements, and sizes of dividers or partitions defining the various storage locations. A sensor array 14 is provided with the storage wall 12 to automatically measure, map, and indicate the layout of storage locations or cubbies 16 in the storage wall 12 (FIG. 3). The storage wall 12 may be utilized as a pick wall for order/item picking operations or as a put wall for order/item put operations (e.g. consolidation and item placement operations). The sensor array 14 includes Time of Flight (ToF) sensors 18 (FIG. 4) for detecting structural elements of the storage wall 12, recognizing touchless gestures from operators, and/or recognizing movement of items into and out of the storage wall 12.

The storage wall 12 includes repositionable dividers/walls 20 that can be moved laterally to adjust the width dimensions of the storage locations 16, as desired (FIG. 3). The sensor array 14 is operable to automatically detect any changes in position of the dividers 20, thereby reducing the time it takes to modify the storage wall 12 because no sensors, lights, etc. must be physically adjusted or repositioned by the operator. The sensor array 14 is operable to perform dynamic zone/storage location allocation for orders (as controlled by a workflow control system or warehouse management system 22) and to illuminate particular cubbies when an operation is required at a particular cubby. The storage wall includes a lamp strip, such as a light emitting diode (LED) strip. Individual lamps (e.g. diodes) fixed on the strip may be addressed independently such that illumination of cubbies is accurate once the dividers 20 have been moved. The touchless nature of the dynamic storage system 10 reduces operator contact with surfaces, thereby reducing cleaning cycle times and reducing or eliminating the transfer of viruses or bacteria (e.g. SARS-CoV-2).

The storage system 10, as depicted in the illustrative embodiment of FIGS. 3 and 4, includes the storage wall 12 with a shelf 24 of cubbies 16, the sensor array 14, and repositionable dividers 20. The sensor array 14 is positioned at a lower front edge of the shelf 24 such that the ToF sensors' 18 line of sight/view is upward and into the cubbies 16. The storage system 10 includes the workflow control system 22 which includes a computer 23 in electronic communication with the sensor array 14 (FIG. 3). The computer 23 includes a processor, circuitry, and can comprise a conventional computing device with software for performing the functions disclosed herein. The workflow control system 22 utilizes information received from the ToF sensors 18 to determine when a repositionable divider has been moved or repositioned to a different position on the shelf and/or when an item has been retrieved from or placed at a cubby 16. The storage system 10 includes one of more confirmation functions permitting an operator to confirm when they have completed an operation. For example, the storage system 10 may include a gesture-recognition touchless confirmation function that is described in more detail below, and/or the storage system 10 may include a physical button which the operator may push to indicate completion of an operation.

The ToF sensors 18 preferably have a conic field of vision such that they are particularly well-suited for distance detection/measurement, such as for movement detection and/or change of position detection. For example, in order to detect movement of the repositionable dividers 20, the ToF sensors 18 may measure a distance between a known location (e.g. at the ToF sensor housing or a benchmark located at a portion of the storage wall 12) and one of the repositionable dividers 20. The workflow control system 22 compares that measurement to a default or baseline measurement of that divider 20 to determine if it has been moved.

It is contemplated that the ToF sensors 18 may operate in the infrared spectrum and are therefore not significantly reliant on color for detection purposes. As such, ToF sensors 18 are well-suited for operation in poor lighting conditions, including dim lighting or over-bright lighting. ToF sensors 18 include lasers which are operable to measure movement over time, and thus can recognize movement, including determining speed of movement and/or direction of movement. While the illustrative embodiments of storage system 10 are described as utilizing ToF sensors, it will be appreciated that gain style sensors (e.g. photocell or optical sensors) may be also be utilized in addition to or alternative to ToF sensors. For example, a photocell may be adapted to sense or measure dimensions of storage locations and/or locations of items at storage locations.

The sensor array 14 is preferably formed from a flexible printed circuit board (PCB) material. The ToF sensors 18 are electronically coupled to the PCB material along with individual diodes of the LED lamp strip. The LED lamp strip is preferably formed with multicolor LED arrays, such as those marketed under the brand NeoPixel® by Adafruit Industries of New York, NY, for example. Another exemplary lamp which may be utilized with storage system 10 is described in commonly owned and assigned U.S. Pat. No. 11,001,445, issued on May 11, 2021, the disclosure of which is hereby incorporated by reference herein in its entirety. In this manner, the sensor array 14 provides a substantially continuous coverage area along the front edge of the shelf 24 to provide touchless pick/put detection and/or cubby illumination. The ToF sensor 18 provides information to the sensor array 14 which may be adapted to recognize one or more touchless confirmation gestures performed by an operator acknowledging that an item retrieval or placement operation has been successfully completed at a storage location 16. Upon recognition of the physical gesture, the sensor array 14 communicates a completion signal to the workflow control system 22. The touchless confirmation recognition function may be performed similar to that described in commonly owned and assigned U.S. Patent Application Publication No. 2022/0164771A1, published on May 26, 2022, the disclosure of which is hereby incorporated by reference herein in its entirety.

The continuous coverage area enables detection and measurement of any movements of the dividers 20, and thus provides for a dynamically modifiable and automatically updating storage wall 12. The dynamic storage wall 12 enables an operator to manually adjust the dividers 20 as desired or necessary for order operations without the need for the operator to manually move/adjust sensors and indicator lights (i.e. pick/put-to-lights) to account for the changes in divider 20 locations. In other words, the sensor array 14 relieves the operator of sliding or removing/replacing various sensors and indicator lights along an electronic rail adjacent the shelf. While the sensor array 14 and ToF sensors 18 are depicted at the lower front edge of the shelf 24, it will be appreciated that the array 14 and/or individual ToF sensors 18 may be positioned in various locations at the storage wall 12 or in various orientations/pitches/angles.

As illustrated in FIG. 1, a method 100 is provided for monitoring one or more dimensions of storage locations or cubbies within a dynamic storage wall, such as for monitoring widths of cubbies 16 within a dynamic storage wall 12 as described above and illustrated in FIG. 3. The method 100 maintains an updated map of the cubbies 16 (FIGS. 1 and 3). The method 100 is well-suited for determining the relative positions of repositionable dividers 20 along the shelf 24. The method 100 utilizes a workflow control system 22 connected with storage wall 12 to visually represent the width of each storage location 16 with a lamp strip mounted adjacent the shelf 24. The method includes providing 102 a default map of default or initial positions of each storage location along the shelf and illuminating 104 corresponding lights on the lamp strip adjacent each storage location to indicate the default map (e.g. width) of storage locations to an operator. Each storage location can be delineated with a different light pattern (e.g. different light colors or geometric shapes). The workflow control system 22 monitors the storage wall with or based on information received from a Time of Flight (ToF) sensor array 14 and determines 106 if one or more repositionable dividers 20 along the shelf 24 have been moved from its default or initial position. If it is determined that one or more dividers 20 have been moved, the method then determines 108 the new position of each moved divider 20 by measuring a distance from a known location to the new location of each moved divider. In other words, by measuring the new position of the moved dividers 20, the workflow system is operable to determine updated widths of storage locations 16 as a function of the measurements of the moved dividers 20. The divider measurements are made with the ToF sensor array 14. The map of storage locations is updated 110 with the new locations of the moved dividers 20 and corresponding ones or a subset of lights on the lamp strip are illuminated adjacent each storage location to indicate or represent the updated map or updated width of storage locations 16 to an operator. Method 100 returns to step 106 to determine if more editing/modifying of the storage wall 12 is required. If the workflow control system 22 determines at 106 that modifications to the storage wall 12 are done, a new map is saved 112 in the computer 23 as the new default map. If more editing or modifying of the storage wall 12 is required and/or performed, the method 100 returns to step 108 to determine the new positions of any moved dividers 20.

For determining the new measurements of dividers 20 at 108, the method 100 includes a step of choosing 114, either automatically or manually, when to measure cubbies to determine 108 if there has been divider movement. At step 114, the workflow control system 22 may automatically update 116 the position measurements of moved dividers by utilizing the measurement data from ToF sensor array 14. Alternatively, an operator may manually indicate 118 that one or more dividers 20 have been moved and that the workflow control system 22 needs to determine the new measurements of the moved dividers 20. The manual initiation/indication may be performed by pressing a physical button and/or by an operator manually gesturing in proximity of a ToF sensor array 14. As an example of determining 108 the new positions of moved dividers 20, the workflow control system 22 may compare the default map of storage locations with measurement data of the moved dividers 20 collected by the ToF sensor array 14. It will be appreciated that the choosing step 114 and one of steps 116 or 118 may be omitted and the workflow sensor may direct measurement of the divider positions either only manually (via operator initiated instruction as described in step 118) or only automatically (via ToF movement sensing as described in step 116).

A method 200 is provided for confirming that a pick or put operation has been completed at a particular storage location 16 of a storage facility. The storage facility includes a workflow control system 22 and the storage location includes each of the following elements: a physical confirmation button 17; a touchless confirmation sensor (e.g. ToF sensor) for recognizing a physical gesture from an operator; and an item movement detection sensor (e.g. ToF sensor or optical sensor) for recognizing movement of an item into or from the storage location. It should be appreciated that the ToF sensor(s) 18 may provide utility and functionality for both the touchless confirmation sensor (referred to hereinafter as 18*a*) and the item movement detection sensor (referred to hereinafter as 18*b*). The physical confirmation button 17, touchless confirmation sensor 18*a*, and item movement detection sensor 18*b* are each in electronic communication with the workflow control system 22. The method 200 includes the workflow control system 22 illuminating 202 an indicator light (e.g. an LED on a lamp strip) adjacent a storage location to indicate to an operator that a pick or put operation is required at that particular storage location. The operator performs 204 the pick or put operation at the storage location, and the workflow control system 22 confirms 206 that the pick or put operation is completed by one of the following: (i) the operator presses 208 the physical confirmation button 17; (ii) the operator performs 210 a confirmatory gesture in proximity of the touchless confirmation sensor 18*a*; or (iii) the movement detection sensor 18*b* determines 212 that the item has been placed into or retrieved from the corresponding storage location. An exemplary touchless confirmation sensor includes a ToF sensor adapted to recognize gesture controls such as that described in previously mentioned U.S. Patent Application Publication No. 2022/0164771A1, for example. Optionally, a lamp or LED (or a subset of lamps) on a lamp strip may be illuminated to direct an operator to where a repositionable divider is to be moved to. For example, the lamp strip, as controlled by the workflow system, may direct an operator via visual cues (e.g. illuminating a light) at a location where repositionable dividers need to be moved to prepare for incoming items.

Thus, the dynamic storage system 10, method 100, and method 200 utilize Time of Flight (ToF) sensors to improve throughput efficiency within a storage facility. The storage system 10 and method 100 enable an operator to adjust a storage wall configuration and quickly return to perform pick/put operations, without requiring the operator to also adjust sensors or indicator lights adjacent the storage wall. Method 200 utilizes ToF sensors to provide multiple confirmation options for an operator to choose from in order to confirm completion of a pick/put operation. The system may include other elements, including indicator lights or displays, such as multicolor light emitting diode (LED) arrays to provide directional instruction to an operator. The system 10 and methods 100 and 200 may reduce physical contact points within an operator's workstation, thereby reducing or eliminating interactions with viruses or bacteria.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A dynamic storage wall comprising:

a shelf comprising a plurality of storage locations in spaced arrangement, each of said storage locations comprising a repositionable divider defining a boundary of each of said storage locations of said shelf;

a sensor array at said shelf and adjacent to said storage locations, wherein said sensor array is configured as an elongate strip having integrated therewith a plurality of time of flight (ToF) sensors and a plurality of lights extending along said strip, and wherein said ToF sensors are adapted to measure a position of said repositionable divider; and a control system comprising a computer in communication with said ToF sensors and said lights via said strip of said sensor array, said control system adapted to update a map of said storage locations when one or more of said repositionable dividers has been moved based on information received from said ToF sensors of said sensor array, and wherein said control system is configured to associate said lights with said storage locations based on said map such that selected ones of said lights are associated with individual ones of said storage locations for indicating which said storage locations items are to be retrieved from or placed at; and wherein said sensor array is configured to transmit a confirmation signal to said control system when an item has been retrieved from or placed at one of said storage locations.

2. The storage wall of claim 1, wherein said elongate strip of said sensor array comprises a plurality of confirmation buttons in communication with said control system, and wherein said control system is configured to associate said confirmation buttons with said storage locations based on said map such that selected ones of said confirmation buttons are associated with individual ones of said storage locations, and wherein said confirmation buttons are configured to be pressed by an operator to transmit the confirmation signal to said computer when an item has been retrieved from or placed at an associated said storage location.

3. The storage wall of claim 1, wherein said ToF sensors are configured to detect when an item has been retrieved from or placed to a storage location, and wherein said sensor array is configured to transmit said confirmation signal based thereon.

4. The storage wall of claim 3, wherein said ToF sensors comprise touchless confirmation sensors configured to recognize a physical gesture from an operator acknowledging that an item retrieval or placement operation has been successfully completed at an associated said storage location and, upon recognition of the physical gesture, said touchless confirmation sensors are operable to communicate said confirmation signal to said control system.

5. The storage wall of claim 4, further comprising a confirmation indicator configured to, upon said control system receiving said confirmation signal, provide a confirmation alert to the operator alerting the operator that said touchless confirmation sensor has recognized the completion of the operation.

6. The storage wall of claim 1, wherein said strip of said sensor array comprises a flexible elongate strip.

7. The storage wall of claim 6, wherein said strip of said sensor array comprises a printed circuit board material.

8. The storage wall of claim 7, wherein said lights of said strip comprises light emitting diodes, and wherein each of said light emitting diodes are individually addressable by said control system.

9. The storage wall of claim 1, wherein said shelf defines a length and said strip of said sensor array extends the length of said shelf.

10. The storage wall of claim 9, wherein said control system is adapted to illuminate a subset of said lights of the strip to indicate a location along said shelf to which said repositionable divider is to be moved to.

11. A method of monitoring retrieval and/or placement of items from storage locations and a position of a repositionable divider provided at a shelf within a storage facility having a workflow control system comprising a computer, the repositionable divider positioned as to provide a divider between two storage locations of the shelf, said method comprising:

providing, at the control system, an initial position of the repositionable divider relative to the shelf;

moving the repositionable divider from its initial position at the shelf to a different position along the shelf;

measuring the different position of the repositionable divider with a sensor array that is disposed at the shelf and in communication with the control system, wherein the sensor array is configured as an elongate strip extending along the shelf and having integrated therewith a plurality of time of flight (ToF) sensors and a plurality of lights extending along said strip and in communication with the control system, and wherein said ToF sensors are adapted to measure a position of the repositionable divider;

determining with the control system that the repositionable divider has been moved based on information received from the sensor array;

associating with the control system selected ones of said lights with each of said storage locations based on the determined position of the repositionable divider whereby the lights are configured for indicating which said storage location items are to be retrieved from or placed at; and determining when an item has been retrieved from or put to a storage location based on information received from the sensor array.

12. The method of claim 11, wherein said providing an initial position of the repositionable divider comprises measuring a position of the repositionable divider from a known location within the storage facility with the sensor array and determining the initial position of the repositionable divider with the control system based on information received from the sensor array.

13. The method of claim 11, wherein the elongate strip of the sensor array further comprises a plurality of confirmation buttons in communication with the control system, and wherein the control system is configured to associate selected ones of said confirmation buttons with each of said storage locations based on the determined position of the repositionable divider, and wherein said confirmation buttons are configured to be pressed by an operator when an item has been retrieved from or placed at an associated said storage location for said determining when an item has been retrieved from or put to a storage location.

14. The method of claim 11, wherein the ToF sensors comprise touchless confirmation sensors, and wherein said determining when an item has been retrieved from or put to a storage location comprises:

an operator acknowledging that an item retrieval or placement operation has been successfully completed at a storage location of the shelf by making a physical gesture to the touchless confirmation sensor;

recognizing the physical gesture with the touchless confirmation sensor; and upon recognition of the physical gesture, the touchless confirmation sensor communicating a completion signal to the control system.

15. The method of claim 11, wherein the plurality of lights comprise operation indicators, and said method further comprises providing a visual cue to an operator with selected ones of the operation indicators to instruct the operator that an operation is required at at least one of the storage locations.

16. The method of claim 11, wherein said strip is mounted to said shelf and each of the lights is individually addressable by the control system, and wherein said method further comprises illuminating a subset of the lights with the control system to indicate at least one chosen from i) a width of one of the storage locations of the shelf and ii) a location along the shelf to which the repositionable divider is to be moved to.

17. A method of monitoring widths of storage locations of a shelf of a dynamic storage wall by determining a position of a repositionable divider of the shelf and representing a width of each storage location with a lamp strip mounted adjacent the shelf, said method comprising:

providing a default map of each storage location along the shelf;

illuminating corresponding lights on the lamp strip adjacent each storage location to indicate the default map of storage locations to an operator, each storage location delineated with a different light pattern;

monitoring the storage wall with a time of flight (ToF) sensor array;

determining if the divider has been moved along the shelf to a new position with the time of flight (ToF) sensor array;

if it is determined that the divider has been moved, determining the new position of the moved divider by measuring, with the ToF sensor array, a distance from a known location to the new position of the moved divider;

updating the map of storage locations based on the new position of the moved divider; and illuminating corresponding lights on the lamp strip adjacent each storage location to indicate the updated width of storage locations to an operator, each storage location delineated by with a different light pattern.

18. The method of claim 17, wherein said determining if the divider has been moved comprises an operator manually gesturing to the ToF sensor array that the divider has been moved.

19. The method of claim 17, wherein said determining if the divider has been moved comprises automatically determining that the divider has been moved with a workflow control system in communication with the ToF sensor array, wherein said method furthering comprises the control system recognizing when the divider has been moved by comparing the default map of storage locations with a measurement of the moved divider from the ToF sensor array.

20. The method of claim 17, wherein the shelf is disposed in a storage facility comprising a workflow control system and each of the storage locations of the shelf including a physical confirmation button, a touchless confirmation sensor for recognizing a physical gesture from an operator, and an item movement detection sensor for recognizing movement of an item into or from the corresponding storage location, each of the physical confirmation button, the touchless confirmation sensor, and the item movement detection sensor are in communication with the control system, and said method further comprising confirming that a pick or put operation has been completed at a required storage location of the shelf, said confirming that a pick or put operation has been completed comprising:

illuminating, with the control system, an indicator light adjacent a storage location to indicate to an operator that a pick or put operation is required at that particular storage location;

the operator performing the pick or put operation at the storage location;

confirming, with the control system, that the pick or put operation is completed by either chosen from i) the operator pressing the physical confirmation button, and ii) the operator performing a confirmatory gesture in proximity to the touchless confirmation sensor; and determining, with the movement detection sensor, that the item has been placed into or retrieved from the storage location.

* * * * *